(12) United States Patent
Cai et al.

(10) Patent No.: US 11,768,976 B2
(45) Date of Patent: Sep. 26, 2023

(54) SUBSEA CHRISTMAS TREE RE-PREDICTION METHOD INTEGRATING KALMAN FILTER AND BAYESIAN NETWORK

(71) Applicants: China University of Petroleum (East China), Qingdao (CN); Ocean University of China, Qingdao (CN); Beihang University, Beijing (CN)

(72) Inventors: Baoping Cai, Qingdao (CN); Yonghong Liu, Qingdao (CN); Xiaoyan Shao, Qingdao (CN); Guijie Liu, Qingdao (CN); Qiang Feng, Qingdao (CN); Qilin Wu, Qingdao (CN); Weifeng Ge, Qingdao (CN); Xincheng Li, Qingdao (CN); Qibing Wu, Qingdao (CN); Xiaolu Wu, Qingdao (CN); Rui He, Qingdao (CN); Zhexian Zou, Qingdao (CN); Honghui Wang, Qingdao (CN); Hongyan Fan, Qingdao (CN)

(73) Assignees: China University of Petroleum (East China), Qingdao (CN); Ocean University of China, Qingdao (CN); Beihang University, Beijing (CN)

( * ) Notice: Subject to any disclaimer, the term of this patent is extended or adjusted under 35 U.S.C. 154(b) by 118 days.

(21) Appl. No.: 17/453,741

(22) Filed: Nov. 5, 2021

(65) Prior Publication Data
US 2023/0021393 A1   Jan. 26, 2023

(30) Foreign Application Priority Data
Jul. 13, 2021   (CN) .......................... 202110787413.9

(51) Int. Cl.
*G06F 30/17* (2020.01)
*E21B 33/035* (2006.01)
(Continued)

(52) U.S. Cl.
CPC ............ *G06F 30/17* (2020.01); *E21B 33/035* (2013.01); *G06F 17/16* (2013.01); *E21B 2200/20* (2020.05); *G06F 2111/08* (2020.01)

(58) Field of Classification Search
CPC ...... G06F 30/17; G06F 17/16; G06F 2111/08; G06F 17/13; G06F 30/27; G06F 2111/10;
(Continued)

(56) References Cited

FOREIGN PATENT DOCUMENTS

CN          105426692 A   *   3/2016   ............. G16Z 99/00

OTHER PUBLICATIONS

Cai, Baoping, Hongyan Fan, Xiaoyan Shao, Yonghong Liu, Guijie Liu, Zengkai Liu, and Renjie Ji. "Remaining useful life re-prediction methodology based on Wiener process: Subsea Christmas tree system as a case study." Computers & Industrial Engineering 151 (2021): 106983. 13 Pages. (Year: 2021).*

(Continued)

*Primary Examiner* — Eunhee Kim
(74) *Attorney, Agent, or Firm* — DLA PIPER LLP (US)

(57) ABSTRACT

The present disclosure belongs to the field of petroleum engineering, and specifically relates to a subsea Christmas tree re-prediction method integrating Kalman filter and Bayesian network. The subsea Christmas tree re-prediction method integrating Kalman filter and Bayesian network includes three steps: digital twin model establishment, degradation process re-prediction model establishment, and remaining useful life calculation model establishment. The subsea Christmas tree re-prediction system integrating Kalman filter and Bayesian network includes a subsea distribution unit information acquisition subsystem mounted on (Continued)

an subsea distribution unit, a subsea control module information acquisition subsystem mounted on a subsea control module, a subsea valve bank information acquisition subsystem mounted on a subsea valve bank, a wellhead mechanical module information acquisition subsystem mounted on a wellhead mechanical module, a subsea environmental information acquisition module mounted on a subsea control module, and a subsea Christmas tree digital twin subsystem mounted in an overwater control station.

7 Claims, 4 Drawing Sheets

(51) Int. Cl.
  *G06F 17/16* (2006.01)
  *G06F 111/08* (2020.01)
(58) Field of Classification Search
  CPC ............... G06F 2119/04; E21B 33/035; E21B 2200/20; Y02A 90/10; G06Q 10/04; G06Q 50/02; G06N 7/01
  See application file for complete search history.

(56) References Cited

OTHER PUBLICATIONS

Zhang, Huihui, Changhua Hu, Hongdong Fan, Wei Zhang, and Yingbin Gao. "A new remaining useful life prediction approach based on Wiener process with an adaptive drift." In 2015 Chinese Automation Congress (CAC), pp. 2052-2056. IEEE, 2015. (Year: 2015).*

Altamiranda, Edmary, and Eliezer Colina. "A system of systems digital twin to support life time management and life extension of subsea production systems." In OCEANS 2019—Marseille, pp. 1-9. IEEE, 2019. (Year: 2019).*

Li, Naipeng, Yaguo Lei, Tao Yan, Ningbo Li, and Tianyu Han. "A Wiener-process-model-based method for remaining useful life prediction considering unit-to-unit variability." IEEE Transactions on Industrial Electronics 66, No. 3 (2018): 2092-2101. (Year: 2018).*

* cited by examiner

SUBSEA CHRISTMAS TREE RE-PREDICTION METHOD INTEGRATING KALMAN FILTER AND BAYESIAN NETWORK

CROSS REFERENCE TO RELATED APPLICATION(S)

This application claims priority to Chinese Patent Application No. 202110787413.9, filed Jul. 13, 2021, which is herein incorporated by reference in its entirety.

TECHNICAL FIELD

The present disclosure belongs to the field of petroleum engineering, and specifically relates to a subsea Christmas tree re-prediction method integrating Kalman filter and Bayesian network.

BACKGROUND ART

With the increase in oil consumption globally, the development of offshore oil has received more and more attention. A subsea Christmas tree is one of key devices for subsea crude oil extraction. The subsea Christmas tree system includes a hydraulic system, a control system, and various valves for testing, operating, closing and throttling the extracted oil, natural gas and other fluids. The hydraulic system is mainly responsible for providing hydraulic power for the subsea valves. The control system is mainly responsible for regulating the production of an oil well and controlling the valves mounted on a tree body and pipelines. The main functions of the tree include: safely isolating an oil reservoir, isolating various unknown subsea liquids, controlling downhole gate valves, monitoring annular pressure, and the like. Compared with a land tree, the subsea Christmas tree has a more complex structure, faces a harsher application environment, and is higher in work pressure.

Remaining useful life prediction is one of main objectives in a condition-based maintenance on-condition maintenance process. Accurate life information prediction is helpful to improve the availability and reliability of the system or device. At the same time, subsequent maintenance strategies are formulated based on the remaining useful life to reduce maintenance costs. Traditional remaining useful life prediction is either to establish a life model based on statistical analysis, or to perform data-driven life analysis based on degradation data. However, for a dynamic system, after working environments and working loads change, the remaining useful life will fluctuate accordingly. For the subsea Christmas tree, the subsea environment is more complicated, and thus it is extremely difficult to optimize the life prediction results. A digital twin technology can realize the re-prediction of the remaining useful life and solve the defects of traditional methods by building a virtual object, a working state, and a working environment the same as a physical entity, and integrating prediction optimization of Kalman filter and uncertainty analysis of Bayesian network at the same time. Therefore, it is essential to provide a subsea Christmas tree re-prediction method integrating Kalman filter and Bayesian network.

SUMMARY

In order to overcome the defects in the prior art, the present disclosure provides a subsea Christmas tree re-prediction method integrating Kalman filter and Bayesian network.

In order to achieve the above objective, according to one aspect of the present disclosure, provided is a subsea Christmas tree re-prediction method integrating Kalman filter and Bayesian network, including three steps: digital twin model establishment, degradation process re-prediction model establishment, and remaining useful life calculation model establishment.

The specific steps for digital twin model establishment are as follows:

101: for a physical structure of a subsea Christmas tree, establishing a digital twin geometric size model;

S102: for a marine environment of the subsea Christmas tree, establishing a digital twin production environment model;

S103: for a process parameter of the subsea Christmas tree, establishing a digital twin production process model; and S104: for a monitoring parameter of the subsea Christmas tree, establishing a digital twin production state model.

The specific steps for degradation process re-prediction model establishment are as follows:

S201: reading system state data of the subsea Christmas tree, and calculating degradation amount of each assembly over time;

S202: estimating a Wiener process parameter based on degradation data;

S203: establishing an initial degradation prediction model for the subsea Christmas tree by using Kalman filter;

S204: establishing a degradation model for the subsea Christmas tree by using Kalman filter and Bayesian network; and S205: updating physical entity information of the subsea Christmas tree to a digital twin model.

The specific steps for remaining useful life calculation model establishment are as follows:

S301: calculating optimized remaining useful life based on the degradation data re-predicted by digital twin and a failure threshold;

S302: calculating a probability distribution model of the remaining useful life of the subsea Christmas tree over time; and S303: feeding life information back to the digital twin model to realize information update of the digital twin model.

According to another aspect of the present disclosure, provided is a subsea Christmas tree re-prediction system integrating Kalman filter and Bayesian network, including a subsea distribution unit information acquisition subsystem mounted on an subsea distribution unit, a subsea control module information acquisition subsystem mounted on a subsea control module, a subsea valve bank information acquisition subsystem mounted on a subsea valve bank, a wellhead mechanical module information acquisition subsystem mounted on a wellhead mechanical module, a subsea environmental information acquisition module mounted on a subsea control module, and a subsea Christmas tree digital twin subsystem mounted in an overwater control station.

The subsea distribution unit information acquisition subsystem includes a subsea distribution unit hydraulic information acquisition module, a subsea distribution unit degradation rate calculation module, and a subsea distribution unit electronic information acquisition module.

The subsea control module information acquisition subsystem includes a subsea control module hydraulic information acquisition module, a subsea control module degradation rate calculation module, and a subsea control module electronic information acquisition module.

The subsea valve bank information acquisition subsystem includes a subsea valve bank hydraulic information acquisition module and a subsea valve bank degradation rate calculation module.

The wellhead mechanical module information acquisition subsystem includes a wellhead mechanical module information acquisition module and a wellhead mechanical module degradation rate calculation module.

The subsea Christmas tree digital twin subsystem includes a system degradation rate calculation module, an initial degradation prediction module, a degradation process re-prediction module, a remaining useful life calculation module, and an information update module.

Compared with the prior art, the present disclosure has the following the beneficial effects: according to the subsea Christmas tree re-prediction method integrating Kalman filter and Bayesian network, initial prediction of the system degradation amount is performed according to the degradation data of each module, then the re-prediction of the system degradation amount is realized by integrating algorithms of Kalman filter and Bayesian network, the results of the initial prediction are optimized by the digital twin technology, and finally the remaining useful life is calculated through the optimized results of the system degradation amount, which is closer to the real life of the system. The subsea Christmas tree re-prediction system integrating Kalman filter and Bayesian network acquires the degradation information of each module, updates real-time environmental information and working state information, and realizes the life information prediction and optimization of a second scene through the digital twin system.

Figure 1:
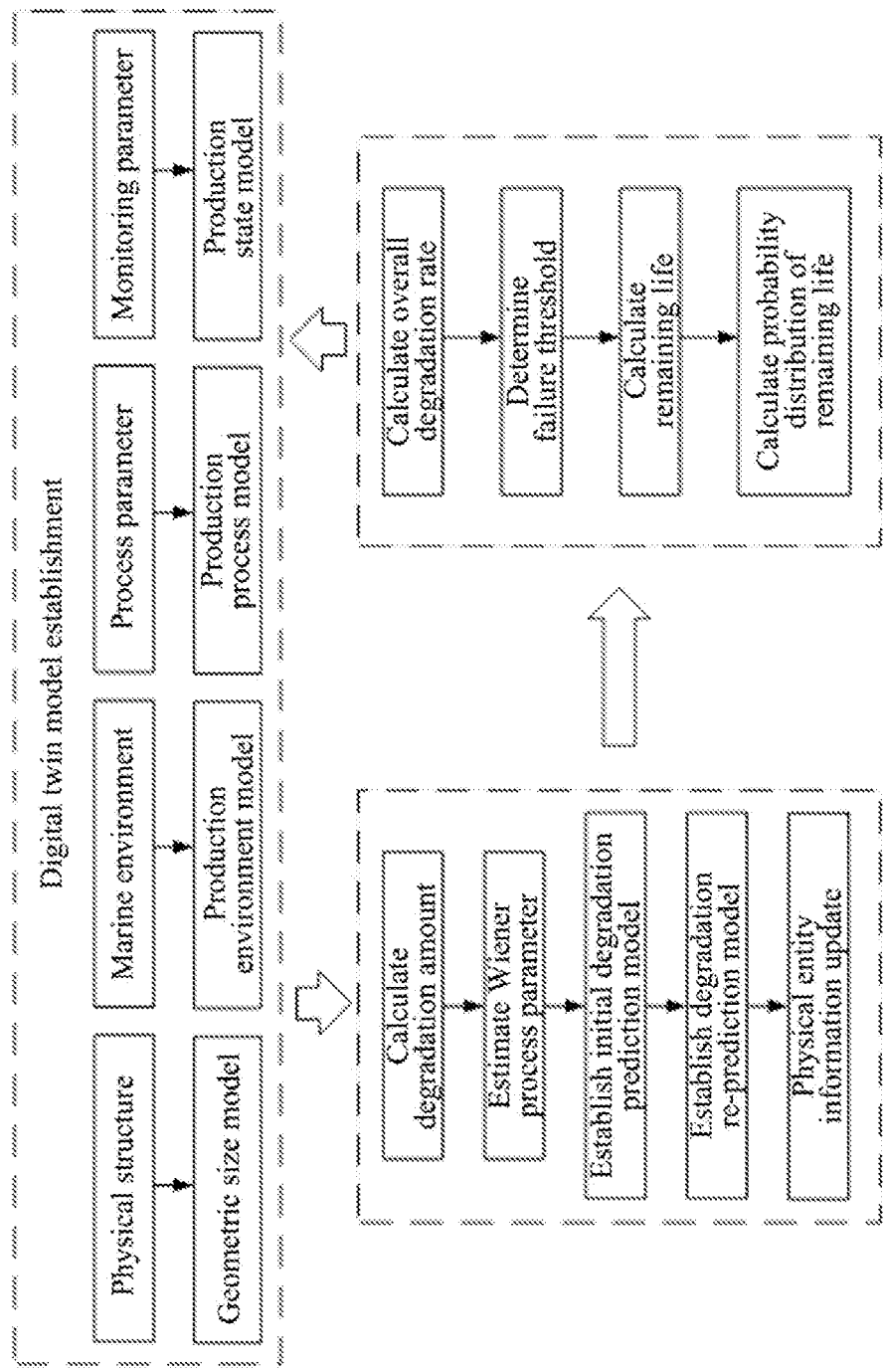
FIG. 1 is a flow chart of subsea Christmas tree re-prediction integrating Kalman filter and Bayesian network.

In the drawings, 101. subsea distribution unit, 102. hydraulic distribution module, 103. electronic distribution module, 104. subsea control module, 105. control pilot valve, 106. first solenoid valve, 107. second solenoid valve, 108. third solenoid valve, 109. subsea electronic module, 110. fourth solenoid valve, 111. fifth solenoid valve, 112. sixth solenoid valve, 113. subsea valve bank, 114. chemical injection valve, 115. conversion valve, 116. annulus wing valve, 117. production wing valve, 118. production main valve, 119. annulus main valve, 120. wellhead mechanical module, 201. subsea Christmas tree digital twin subsystem, 202. initial degradation prediction module, 203. degradation process re-prediction module, 204. remaining useful life calculation module, 205. information update module, 206. system degradation rate calculation module, 207. subsea distribution unit information acquisition subsystem, 208. subsea distribution unit hydraulic information acquisition module, 209. subsea distribution unit degradation rate calculation module, 210. subsea distribution unit electronic information acquisition module, 211. subsea control module information acquisition subsystem, 212. subsea control module hydraulic information acquisition module, 213. subsea control module degradation rate calculation module, 214. subsea control module electronic information acquisition module, 215. subsea valve bank information acquisition subsystem, 216. subsea valve bank hydraulic information acquisition module, 217. subsea valve bank degradation rate calculation module, 218. wellhead mechanical module information acquisition subsystem, 219. wellhead mechanical module mechanical information acquisition module, 220. wellhead mechanical module degradation rate calculation module, and 221. subsea environmental information acquisition module.

DETAILED DESCRIPTION OF THE EMBODIMENTS

As shown in FIG. 1, provided is a subsea Christmas tree re-prediction method integrating Kalman filter and Bayesian network, including three steps: digital twin model establishment, degradation process re-prediction model establishment, and remaining useful life calculation model establishment.

The specific steps for digital twin model establishment are as follows:

S101: For a physical structure of a subsea Christmas tree, establish a digital twin geometric size model. The model includes an electronic structure geometric size model, a hydraulic structure geometric size model, a mechanical structure geometric size model. The three structure geometric size models reflect a geometric size and an assembly relationship of a physical system.

S102: For a marine environment of the subsea Christmas tree, establish a digital twin production environment model. The model includes real-time dynamic data composed of marine environmental monitoring data such as typhoon, internal wave current, sea water temperature and pressure.

S103: For a process parameter of the subsea Christmas tree, establish a digital twin production process model. The model includes oil and gas production process data such as conventional oil recovery, chemical injection, and paraffin removal.

S104: For a monitoring parameter of the subsea Christmas tree, establish a digital twin production state model. The process includes multi-source sensor system state data of a mechanical structure, a hydraulic structure, and an electronic structure.

The specific steps for degradation process re-prediction model establishment are as follows:

S201: Read system state data of the subsea Christmas tree, calculate degradation amount of each assembly over time. Voltage information of the electronic structure, pressure of the hydraulic structure, flow information and stress-strain information of the mechanical structure of a historical process of the subsea Christmas tree are read, and historical degradation amount is determined by using a subsea Christmas tree failure mode;

S202: Estimate a Wiener process parameter based on degradation data. For the subsea Christmas tree, a degradation model of each structure conforms to a Wiener process:

$$X(t)=X(0)+\lambda t+\sigma_B B(t),$$

where $\lambda$ is a drift coefficient, $\sigma_B$ is a diffusion coefficient, and $B(t)$ is a standard Brownian motion.

For n sets of degradation data, each set of degradation data has i monitoring points, the degradation amount is recorded as X, the time is recorded as T, and the Wiener process parameter is estimated by using a maximum likelihood estimation method:

$$\ln L(\Theta|X) = -\frac{1}{2}\ln 2\pi ni - \frac{1}{2}\ln \sigma_B^2 ni -$$
$$\frac{1}{2}\sum_{n=1}^{i}\ln|\Phi_n| - \frac{1}{2\sigma_B^2}\sum_{n=1}^{i}(X_n - \lambda_n X_n)'|\Phi_n|^{-1}(X_n - \lambda_n X_n),$$

where $\Phi_n = \text{diag}(\Delta T_{n,t1}, \Delta T_{n,t2}, \ldots, \Delta T_{n,ti})$.

The obtained Wiener process parameter is substituted into the Wiener process to obtain the degradation amount of the electronic structure, the hydraulic structure and the mechanical structure following the Wiener process.

S203: Establish an initial degradation prediction model for the subsea Christmas tree, and initially predict degradation of the subsea Christmas tree in the established digital twin model by using Kalman filter. The Kalman filter can realize optimal selection of a state estimation value and a state measurement value to obtain an optimal predicted value. Kalman filter includes five steps:

① State Prediction:

$\hat{x}_t^- = F_t \hat{x}_{t-1} + B_t u_t$, where $F_t$ is a state transition matrix, $B_t$ is a control matrix, representing the influence of a control variable $u_t$ on a current moment, $\hat{X}$ represents an estimated value of x, and $\hat{x}_t^-$ represents an estimated value of the current moment based on the state of a previous moment.

② Covariance Matrix:

$P_t^- = F P_{t-1} F^T + Q$ where P is a covariance matrix and Q is the noise of the prediction model.

③ Observed Value:

$z_t = H x_t + \xi$, where $z_t$ represents an observed value, H represents an observed matrix, and $\xi$ is observed noise.

④ State Update:

$\hat{x}_t = \hat{x}_t^- + K_t(z_t - H\hat{x}_t^-)$, where $K_t$ is a Kalman coefficient, which can be expressed as:

$K_t = P_t^- H^T (H P_t^- H^T + R)^{-1}$, where R is a covariance matrix of the observed noise.

⑤ Covariance Matrix Update:

$P_t = (I - K_t H) P_t^-$.

To use Kalman filter to predict the state of the Wiener process, the Wiener process needs to be transformed into a state-space equation:

$$\begin{cases} x_t = x_{t-1} + \lambda_{t-1} t + \sigma_B B(0, \Delta t) \\ y_t = x_t + \xi \end{cases},$$

in the Wiener process, $\lambda_t = \lambda_{t-1}$ is set, then the constructed Kalman filter is:

$$\begin{cases} \begin{bmatrix} x_t \\ \lambda_t \end{bmatrix} = \begin{bmatrix} 1 & \Delta t \\ 0 & 1 \end{bmatrix} \begin{bmatrix} x_{t-1} \\ \lambda_{t-1} \end{bmatrix} + \begin{bmatrix} \sigma_B^2 \Delta t \\ 0 \end{bmatrix} \\ y_t = \begin{bmatrix} 1 & 0 \end{bmatrix} \begin{bmatrix} x_{t-1} \\ \lambda_{t-1} \end{bmatrix} + \xi \end{cases},$$

the noise Q of the prediction model can be expressed as:

$$Q = \begin{bmatrix} \sigma_B^2 \Delta t & 0 \\ 0 & 0 \end{bmatrix},$$

an initial state can be expressed as:

$$X_0 = \begin{bmatrix} 0 \\ \mu_{t_0} \end{bmatrix},$$

an initial covariance matrix can be expressed as:

$$P_0 = \begin{bmatrix} 0 & 0 \\ 0 & \sigma_{t_0}^2 \end{bmatrix},$$

with a Kalman filter algorithm constructed by using the Wiener process, combined with given initial conditions, the initial prediction of the degradation amount is realized through optimal estimation for an estimated value and a measured value of the system by Kalman filter.

Figure 2:
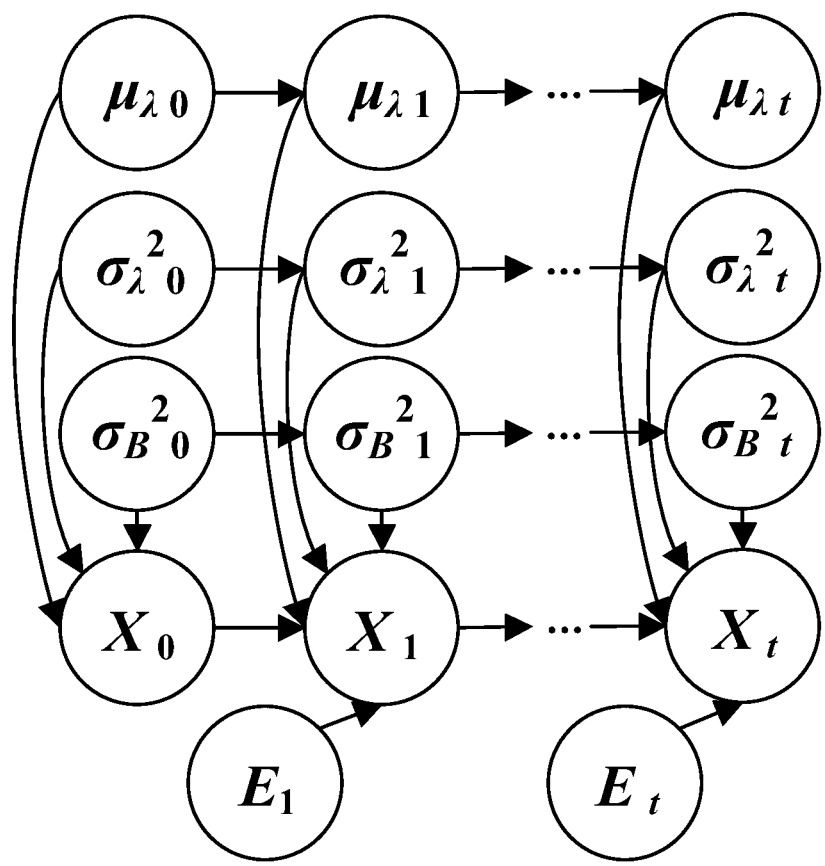
FIG. 2 is a subsea Christmas tree degradation re-prediction dynamic Bayesian network.

S204: Establish a degradation re-prediction model for the subsea Christmas tree, and establish the Wiener process as a dynamic Bayesian network in the digital twin model as shown in FIG. 2 by using the Bayesian network. First, main parameters $\mu_\lambda$, $\sigma_\lambda^2$, $\sigma_B^2$ and X of the Wiener process are nodes of a static Bayesian network, arrows between the nodes indicate a physical relationship between the nodes, after time expansion, a dynamic Bayesian network of t time slices is obtained, E represents an evidence node, and supplementary information in a physical entity can be input to the dynamic Bayesian network to realize information update of the dynamic Bayesian network.

A calculation result of the dynamic Bayesian network after the information update is input as a new state measured value into the Kalman filter algorithm established in S203 for secondary calculation of the degradation amount. The secondary calculation is based on secondary optimization prediction based on an initial state estimated value and credibility of a measured value calculated by the dynamic Bayesian network after information supplementation, that is, the re-prediction of the degradation amount, which can be expressed as:

$\hat{x}_t = \hat{x}_t^- + K_t(z_{DTS} - H\hat{x}_t^-)$, where $z_{DTS}$ represents a new measured value calculated by the dynamic Bayesian network.

Finally, a ratio of the degradation amount of the electronic structure, the hydraulic structure, and the mechanical structure to overall performance of the electronic structure, the hydraulic structure, and the mechanical structure is defined as the degradation rate of the electronic structure, the hydraulic structure, and the mechanical structure, then an overall degradation rate of the electronic structure containing n assemblies is:

$y_e = 1 - (1 - y_{e1}) \cdot (1 - y_{e2}) \cdot \ldots \cdot (1 - y_{en})$, an overall degradation rate of the hydraulic structure containing n assemblies is:

$y_h = 1 - (1 - y_{h1}) \cdot (1 - y_{h2}) \cdot \ldots \cdot (1 - y_{hn})$ an overall degradation rate of the mechanical structure containing n assemblies is:

$y_m = 1 - (1 - y_{m1}) \cdot (1 - y_{m2}) \cdot \ldots \cdot (1 - y_{mn})$ then an overall degradation rate of the system is:

$$y=1-(1-y_e)\cdot(1-y_h)\cdot(1-y_m).$$

S205: Update physical entity information of the subsea Christmas tree to the digital twin model, and input environmental information and working state information as supplementary information into the evidence node of the dynamic Bayesian network model of the digital twin model to realize real-time degradation amount calculation of the digital twin model. The degradation amount re-predicted by the digital twin model is fed back to the physical entity of the subsea Christmas tree at the same time, and the Wiener process parameter is continuously corrected through comparison with actual degradation amount to realize the correction of the digital twin model.

The specific steps for remaining useful life calculation model establishment are as follows:

S301: Calculate optimized remaining useful life based on the degradation data re-predicted by the digital twin model and a failure threshold, and determining a system failure threshold according to system failure data. A moment when the degradation amount reaches the failure threshold is referred to as failure time, and it is believed that the system will not be able to work normally. The remaining useful life is defined as a time period from detection time to the failure time.

S302: Calculate a probability distribution model of the remaining useful life of the subsea Christmas tree over time. According to the characteristics of the degradation of the Wiener process, the probability distribution of the remaining useful life can be defined as:

$$f(t)=\sqrt{\frac{(x_{th}-x_t)^2}{2\pi\sigma_B^2 t^3}}\exp\left(-\frac{(x_{th}-x_t-\lambda t)^2}{2\sigma_B^2 t}\right),$$

where $x_{th}$ is the failure threshold.

S303: Feed life information back to the digital twin model to realize information update of the digital twin model.

Figure 3:
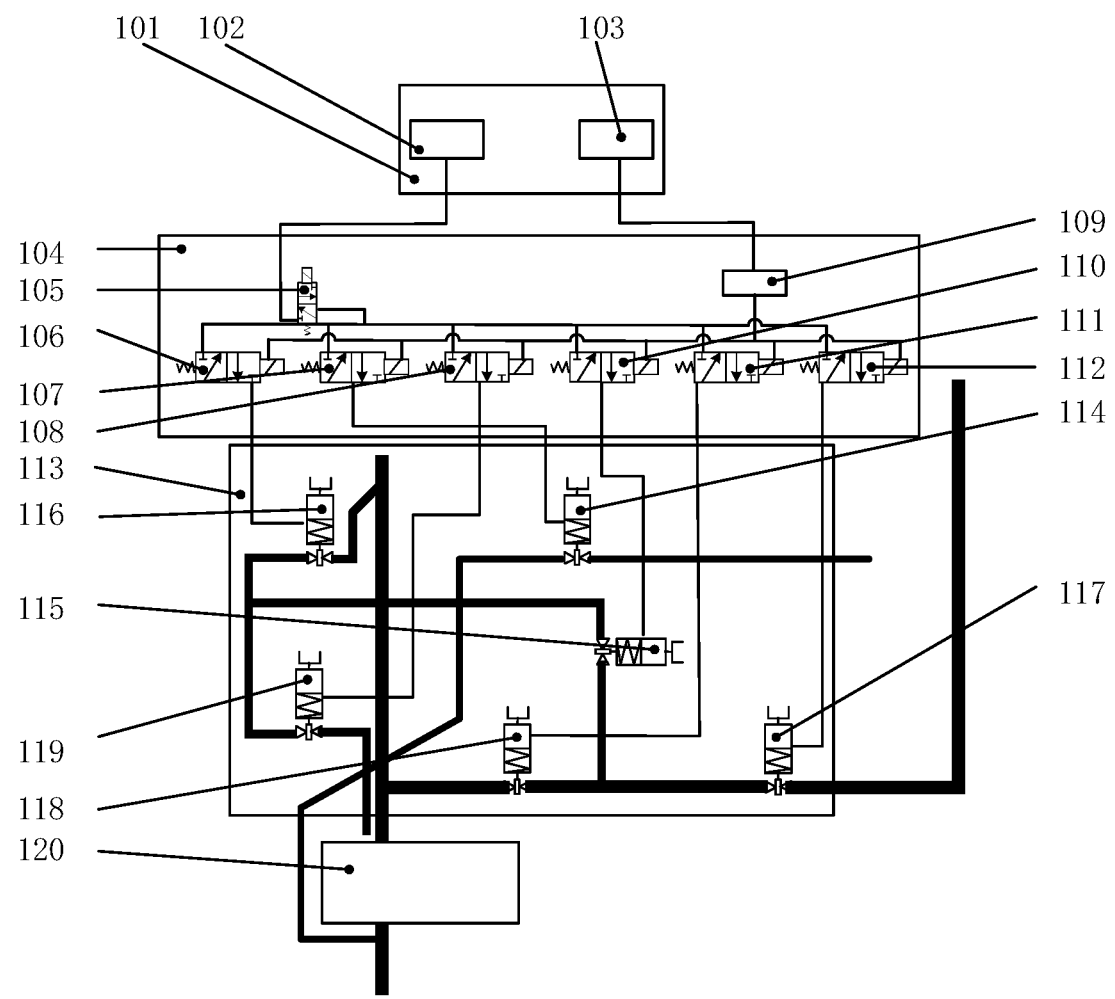
FIG. 3 is a schematic diagram of a subsea Christmas tree.

As shown in FIG. 3, the subsea Christmas tree includes a subsea distribution unit 101, a subsea control module 104, a subsea valve bank 113, and a wellhead mechanical module 120. The subsea distribution unit 101 is located outside the tree, is mounted on a seabed bracket and includes: a hydraulic distribution module 102 and an electronic distribution module 103. The hydraulic distribution module 102 is connected to a control pilot valve 105 through a hydraulic pipeline for providing hydraulic power for the control pilot valve 105. The electronic distribution module 103 is connected to a subsea electronic module 109 through a cable for providing electric power for the subsea electronic module 109. The subsea control module 104 is located between the subsea distribution unit 101 and the subsea Christmas tree, is mounted on a subsea support, and includes: the control pilot valve 105, the subsea electronic module 109, a first solenoid valve 106, a second solenoid valve 107, a third solenoid valve 108, a fourth solenoid valve 110, a fifth solenoid valve 111, and a sixth solenoid valve 112. The control pilot valve 105 is connected to the first solenoid valve 106, the second solenoid valve 107, the third solenoid valve 108, the fourth solenoid valve 110, the fifth solenoid valve 111, and the sixth solenoid valve 112 through hydraulic pipelines for providing hydraulic power for the six solenoid valves. The subsea electronic module 109 is connected to the first solenoid valve 106, the second solenoid valve 107, the third solenoid valve 108, the fourth solenoid valve 110, the fifth solenoid valve 111, and the sixth solenoid valve 112 through cables for controlling opening and closing of the six solenoid valves. The first solenoid valve 106 is connected to an annulus wing valve 116 through a hydraulic pipeline for controlling opening and closing of the annulus wing valve 116. The second solenoid valve 107 is connected to a chemical injection valve 114 through a hydraulic pipeline for controlling opening and closing of the chemical injection valve 114. The third solenoid valve 108 is connected to an annulus main valve 119 through a hydraulic pipeline for controlling opening and closing of the main annulus valve 119. The fourth solenoid valve 110 is connected to a conversion valve 115 through a hydraulic pipeline for controlling opening and closing of the conversion valve 115. The fifth solenoid valve 111 is connected to a production main valve 118 through a hydraulic pipeline for controlling opening and closing of the production main valve 118. The sixth solenoid valve 112 is connected to a production wing valve 117 through a hydraulic pipeline for controlling opening and closing of the production wing valve 117. The subsea valve bank 113 is located on the tree, is mounted on a tree body of the subsea Christmas tree, and includes the chemical injection valve 114, the conversion valve 115, the annulus wing valve 116, the production wing valve 117, the production main valve 118, and the annulus main valve 119. The chemical injection valve 114, the conversion valve 115, the annulus wing valve 116, the production wing valve 117, the production main valve 118, and the annulus main valve 119 are connected to an oil pipeline for controlling oil transportation. The wellhead mechanical module 120 is located at a subsea wellhead and is mounted at a bottom of the subsea Christmas tree. The wellhead mechanical module 120 is connected to the oil pipeline for providing subsea oil and gas transportation power.

Figure 4:
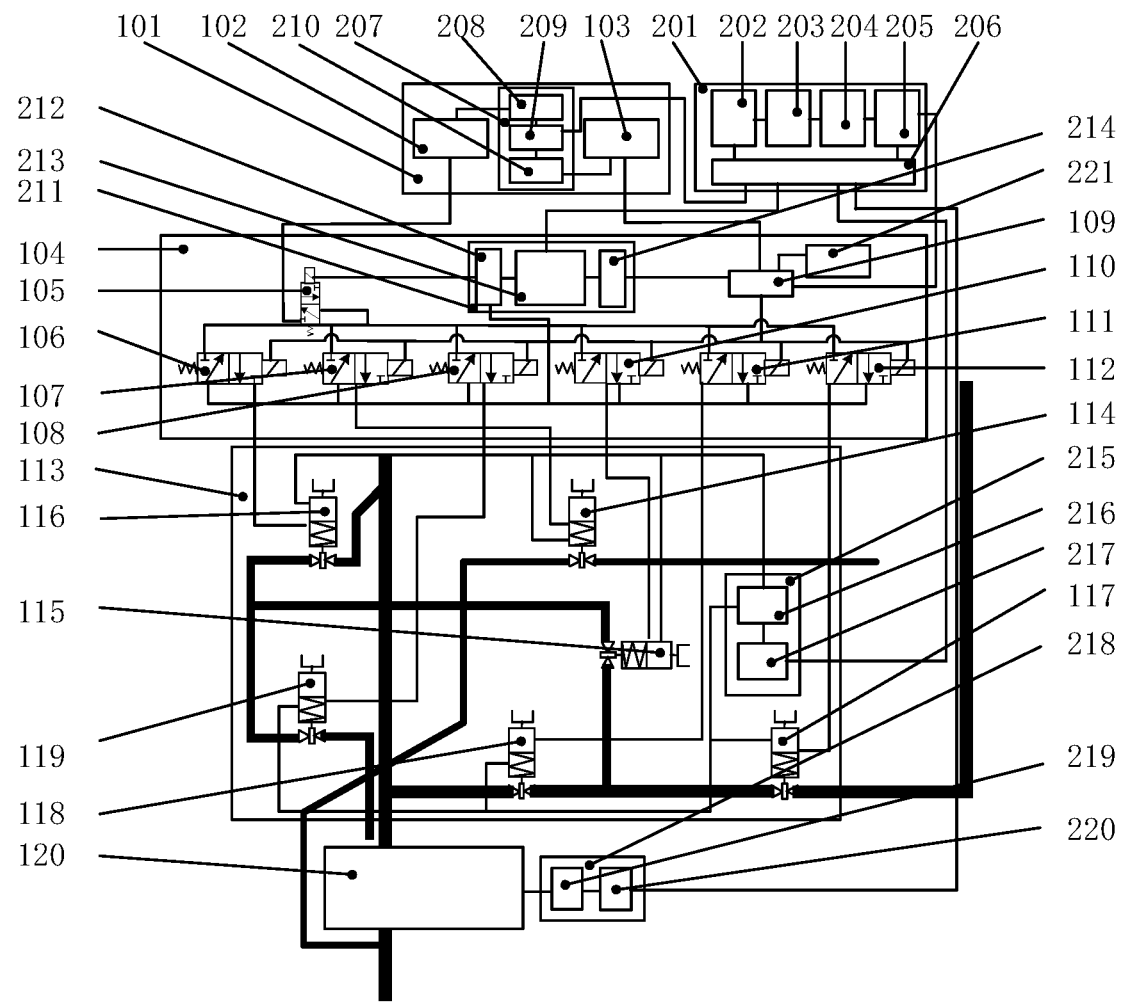
FIG. 4 is a schematic diagram of a subsea Christmas tree re-prediction system integrating Kalman filter and Bayesian network.

As shown in FIG. 4, a subsea Christmas tree re-prediction system integrating Kalman filter and Bayesian network includes a subsea distribution unit information acquisition subsystem 207 mounted on an subsea distribution unit 101, a subsea control module information acquisition subsystem 211 mounted on a subsea control module 104, a subsea valve bank information acquisition subsystem 215 mounted on a subsea valve bank 113, a wellhead mechanical module information acquisition subsystem 218 mounted on a wellhead mechanical module 120, a subsea environmental information acquisition module 221 mounted on a subsea control module 104, and a subsea Christmas tree digital twin subsystem 201 mounted in an overwater control station.

The subsea distribution unit information acquisition subsystem 207 includes a subsea distribution unit hydraulic information acquisition module 208, a subsea distribution unit degradation rate calculation module 209, and a subsea distribution unit electronic information acquisition module 210. The subsea distribution unit hydraulic information acquisition module 208 is connected to a hydraulic distribution module 102 through a cable for acquiring degradation data of the hydraulic distribution module 102. The subsea distribution unit electronic information acquisition module 210 is connected to an electronic distribution module 103 through a cable for acquiring degradation data of the electronic distribution module 103. The subsea distribution unit degradation rate calculation module 209 is connected to the subsea distribution unit hydraulic information acquisition module 208 and the subsea distribution unit electronic information acquisition module 210 through cables for processing the degradation data acquired by the subsea distribution unit hydraulic information acquisition module 208 and the subsea distribution unit electronic information acquisition module 210 and calculating a degradation rate of the subsea distribution unit 101.

The subsea control module information acquisition subsystem 211 includes a subsea control module hydraulic information acquisition module 212, a subsea control module degradation rate calculation module 213, and a subsea control module electronic information acquisition module 214. The subsea control module hydraulic information acquisition module 212 is connected to a first solenoid valve 106, a second solenoid valve 107, a third solenoid valve 108, a fourth solenoid valve 110, a fifth solenoid valve 111, and a sixth solenoid valve 112 through cables for acquiring degradation data of the first solenoid valve 106, the second solenoid valve 107, the third solenoid valve 108, the fourth solenoid valve 110, the fifth solenoid valve 111, and the sixth solenoid valve 112. The subsea control module electronic information acquisition module 214 is connected to a subsea electronic module 109 through a cable for acquiring degradation data of the subsea electronic module 109. The subsea control module degradation rate calculation module 213 is connected to the subsea control module hydraulic information acquisition module 212 and the subsea control module electronic information acquisition module 214 through cables for processing the degradation data acquired by the subsea control module hydraulic information acquisition module 212 and the subsea control module electronic information acquisition module 214 and calculating a degradation rate of the subsea control module 104.

The subsea valve bank information acquisition subsystem 215 includes a subsea valve bank hydraulic information acquisition module 216 and a subsea valve bank degradation rate calculation module 217. The subsea valve bank hydraulic information acquisition module 216 is connected to a chemical injection valve 114, a conversion valve 115, an annulus wing valve 116, a production wing valve 117, a production main valve 118, and an annulus main valve 119 through cables for acquiring degradation data of the chemical injection valve 114, the conversion valve 115, the annulus wing valve 116, the production wing valve 117, the production main valve 118, and the annulus main valve 119. The subsea valve bank degradation rate calculation module 217 is connected to the subsea valve bank hydraulic information acquisition module 216 through a cable for processing degradation data acquired by the subsea valve bank hydraulic information acquisition module 216 and calculating a degradation rate of the subsea valve bank 113.

The wellhead mechanical module information acquisition subsystem 218 includes a wellhead mechanical module mechanical information acquisition module 219 and a wellhead mechanical module degradation rate calculation module 220. The wellhead mechanical module mechanical information acquisition module 219 is connected to the wellhead mechanical module 120 through a cable for acquiring degradation data of the wellhead mechanical module 120. The wellhead mechanical module degradation rate calculation module 220 is connected to the wellhead mechanical module mechanical information acquisition module 219 through a cable for processing the degradation data acquired by the wellhead mechanical module mechanical information acquisition module 219 to calculate a degradation rate of the wellhead mechanical module 120.

The subsea environmental information acquisition module 221 is connected to the subsea electronic module 109 through a cable for acquiring subsea environmental information of the subsea Christmas tree and inputting the subsea environmental information into the subsea electronic module 109.

The subsea Christmas tree digital twin subsystem 201 includes a system degradation rate calculation module 206, an initial degradation prediction module 202, a degradation process re-prediction module 203, a remaining useful life calculation module 204, and an information update module 205. The system degradation rate calculation module 206 is connected to the subsea distribution unit degradation rate calculation module 209 of the subsea distribution unit information acquisition subsystem 207, the subsea control module degradation rate calculation module 213 of the subsea control module information acquisition subsystem 211, the subsea valve bank degradation rate calculation module 217 of the subsea valve bank information acquisition subsystem 215, and the wellhead mechanical module degradation rate calculation module 220 of the wellhead mechanical module information acquisition subsystem 218 through cables for processing degradation rate information of the subsea distribution unit degradation rate calculation module 209, the subsea control module degradation rate calculation module 213, the subsea valve bank degradation rate calculation module 217, and the wellhead mechanical module degradation rate calculation module 220 and calculating an overall degradation rate of the subsea Christmas tree. The initial degradation prediction module 202 is connected to the system degradation rate calculation module 206 through a cable for initially predicting a system degradation state. The degradation process re-prediction module 203 is connected to the initial degradation prediction module 202 through a cable for optimizing the system degradation state predicted by the initial degradation prediction module 202 to realize the re-prediction of the degradation process. The remaining useful life calculation module 204 is connected to the degradation process re-prediction module 203 through a cable for calculating an overall remaining useful life of the subsea Christmas tree system. The information update module 205 is connected to the remaining useful life calculation module 204 through a cable for updating life information of the system. The information update module 205 is connected to the subsea electronic module 109 through a cable for acquiring the environmental information and working state information of the subsea Christmas tree to achieve information update of the environment and working state. The information update module 205 is connected to the system degeneration rate calculation module 206 by a cable for inputting the updated life information, environmental information, and working state information into the system degradation rate calculation module 206 to realize the parameter update of the system degradation rate calculation module 206.

What is claimed is:

1. A subsea Christmas tree re-prediction method integrating Kalman filter and Bayesian network, comprising three steps:
   digital twin model establishment,
   degradation process re-prediction model establishment, and
   remaining useful life calculation model establishment,
   wherein the specific steps for digital twin model establishment are as follows:
   for a physical structure of a subsea Christmas tree, establishing a digital twin geometric size model, wherein the digital twin geometric size model comprises an electronic structure geometric size model, a hydraulic structure geometric size model, a mechanical structure geometric size model, and the three structure geometric size models reflect a geometric size and an assembly relationship of a physical system;

for a marine environment of the subsea Christmas tree, establishing a digital twin production environment model, wherein the digital twin production environment model comprises real-time dynamic data composed of marine environmental monitoring data comprising typhoon, internal wave current, sea water temperature and pressure;

for a process parameter of the subsea Christmas tree, establishing a digital twin production process model, wherein the digital twin production process model comprises oil and gas production process data comprising conventional oil recovery, chemical injection, and paraffin removal;

for a monitoring parameter of the subsea Christmas tree, establishing a digital twin production state model, wherein the digital twin production state model comprises multi-source sensor system state data of a mechanical structure, a hydraulic structure, and an electronic structure;

the specific steps for degradation process re-prediction model establishment are as follows:

reading system state data of the subsea Christmas tree, calculating degradation amount of each assembly over time, wherein voltage information of the electronic structure, pressure of the hydraulic structure, flow information and stress-strain information of the mechanical structure of a historical process of the subsea Christmas tree are read, and historical degradation amount is determined by using a subsea Christmas tree failure mode;

estimating a Wiener process parameter based on degradation data, wherein for the subsea Christmas tree, a degradation model of each structure conforms to a Wiener process:

$$X(t)=X(0)+\lambda t+\sigma_B B(t),$$

where $\lambda$ is a drift coefficient, $\sigma_B$ is a diffusion coefficient, and B(t) is a standard Brownian motion, and t is a sampling time and n represents a number of sets of degradation data and i represents a number of monitoring points in each set of degradation data;

for n sets of degradation data, each set of degradation data has i monitoring points, the degradation amount is recorded as X, the time is recorded as T, and the Wiener process parameter is estimated by using a maximum likelihood estimation method:

$$\ln L(\Theta \mid X) = -\frac{1}{2}\ln 2\pi ni - \frac{1}{2}\ln \sigma_B^2 ni -$$

$$\frac{1}{2}\sum_{n=1}^{i}\ln|\Phi_n| - \frac{1}{2\sigma_B^2}\sum_{n=1}^{i}(X_n - \lambda_n X_n)'|\Phi_n|^{-1}(X_n - \lambda_n X_n),$$

where $\Phi_n = \text{diag}(\Delta T_{n,t1}, \Delta T_{n,t2}, \ldots, \Delta T_{n,ti})$; and the obtained Wiener process parameter is substituted into the Wiener process to obtain the degradation amount of the electronic structure, the hydraulic structure and the mechanical structure following the Wiener process respectively;

establishing an initial degradation prediction model for the subsea Christmas tree, and initially predicting degradation of the subsea Christmas tree in the established digital twin model by using Kalman filter, wherein the Kalman filter realizes optimal selection of a state estimation value and a state measurement value to obtain an optimal predicted value, and the Kalman filter comprises five steps:

① state prediction:

$$\hat{x}_t^- = F_t \hat{x}_{t-1} + B_t u_t,$$

where $F_t$ is a state transition matrix, $B_t$ is a control matrix, representing the influence of a control variable $u_t$ representing a driven input vector on a current moment, $\hat{x}$ represents an estimated value of x, and $\hat{x}_t^-$ represents an estimated value of the current moment based on the state of a previous moment;

② covariance matrix:

$$P_t^- = FP_{t-1}F^T + Q,$$

where P is a covariance matrix and Q is the noise of the prediction model;

③ observed value:

$$z_t = Hx_t + \xi,$$

where $z_t$ represents an observed value, H represents an observed matrix, and is observed noise;

④ state update:

$$\hat{x}_t = \hat{x}_t^- + K_t(z_t - H\hat{x}_t^-),$$

where $K_t$ is a Kalman coefficient, which is expressed as:

$$K_t = P_t^- H^T (HP_t^- H^T + R)^{-1},$$

where R is a covariance matrix of the observed noise;

⑤ covariance matrix update:

$$P_t = (I - K_t H) P_t^-,$$

wherein I represents an identity matrix;

to use Kalman filter to predict the state of the Wiener process, the Wiener process needs to be transformed into a state-space equation:

$$\begin{cases} x_t = x_{t-1} + \lambda_{t-1}t + \sigma_B B(0, \Delta t) \\ y_t = x_t + \xi \end{cases},$$

in the Wiener process, $\lambda_t = \lambda_{t-1}$ is set, then the constructed Kalman filter is:

$$\begin{cases} \begin{bmatrix} x_t \\ \lambda_t \end{bmatrix} = \begin{bmatrix} 1 & \Delta t \\ 0 & 1 \end{bmatrix} \begin{bmatrix} x_{t-1} \\ \lambda_{t-1} \end{bmatrix} + \begin{bmatrix} \sigma_B^2 \Delta t \\ 0 \end{bmatrix} \\ y_t = [1 \ 0] \begin{bmatrix} x_{t-1} \\ \lambda_{t-1} \end{bmatrix} + \xi \end{cases},$$

the noise Q of the prediction model is expressed as $$Q = \begin{bmatrix} \sigma_B^2 \Delta t & 0 \\ 0 & 0 \end{bmatrix},$$

an initial state is expressed as:

$$X_0 = \begin{bmatrix} 0 \\ \mu_{t_o} \end{bmatrix},$$

an initial covariance matrix is expressed as:

$$P_0 = \begin{bmatrix} 0 & 0 \\ 0 & \sigma_{t_0}^2 \end{bmatrix},$$

with an Kalman filter algorithm constructed by using the Wiener process, combined with given initial conditions, the initial prediction of the degradation amount is realized through optimal estimation for the state measurement value and the state measurement value by Kalman filter;

establishing a degradation re-prediction model for the subsea Christmas tree, and establishing the Wiener process as a dynamic Bayesian network in the digital twin model by using the Bayesian network, wherein first, main parameters $\mu_\lambda$, $\sigma_\lambda^2$, $\sigma_B^2$ and X of the Wiener process are nodes of a static Bayesian network, arrows between the nodes indicate a physical relationship between the nodes, after time expansion, a dynamic Bayesian network of t time slices is obtained, E represents an evidence node, and supplementary information in a physical entity is input to the dynamic Bayesian network to realize information update of the dynamic Bayesian network;

a calculation result of the dynamic Bayesian network after the information update is input as a new state measured value into the Kalman filter algorithm established in S203 for secondary calculation of the degradation amount; the secondary calculation performs secondary optimization prediction based on an initial state estimated value and credibility of a measured value calculated by the dynamic Bayesian network after information supplementation, that is, the re-prediction of the degradation amount, which is expressed as:

$\hat{x}_t = \hat{x}_t^- + K_t(z_{DTs} - H\hat{x}_t^-),$ where $z_{DTs}$ represents a new measured value calculated by the dynamic Bayesian network; and finally, a ratio of the degradation amount of the electronic structure, the hydraulic structure, and the mechanical structure to overall performance of the electronic structure, the hydraulic structure, and the mechanical structure is defined as the degradation rate of the electronic structure, the hydraulic structure, and the mechanical structure, then an overall degradation rate of the electronic structure containing n assemblies is:

$y_e = 1-(1-y_{e1})\cdot(1-y_{e2})\cdot \ldots \cdot(1-y_{en}),$ an overall degradation rate of the hydraulic structure containing n assemblies is:

$y_h = 1-(1-y_{h1})\cdot(1-y_{h2})\cdot \ldots \cdot(1-y_{hn}),$ an overall degradation rate of the mechanical structure containing n assemblies is:

$y_m = 1-(1-y_{m1})\cdot(1-y_{m2})\cdot \ldots \cdot(1-y_{mn}),$ and then an overall degradation rate of the system is:

$y = 1-(1-y_e)\cdot(1-y_h)\cdot(1-y_m);$ wherein e represents an initial of the electronic structure, h represents an initial of the hydraulic structure, m represents an initial of the mechanical structure; and updating physical entity information of the subsea Christmas tree to the digital twin model, and inputting environmental information and working state information as supplementary information into the evidence node of the dynamic Bayesian network model of the digital twin model to realize real-time degradation amount calculation of the digital twin model, wherein the degradation amount re-predicted by the digital twin model is fed back to the physical entity of the subsea Christmas tree at the same time, and the Wiener process parameter is continuously corrected through comparison with actual degradation amount to realize the correction of the digital twin model;

the specific steps for remaining useful life calculation model establishment are as follows:

calculating optimized remaining useful life based on the degradation data re-predicted by the digital twin model and a failure threshold, and determining a system failure threshold according to system failure data, wherein a moment when the degradation amount reaches the failure threshold is referred to as failure time, and the remaining useful life is defined as a time period from detection time to the failure time;

calculating a probability distribution model of the remaining useful life of the subsea Christmas tree over time, wherein according to the characteristics of the degradation of the Wiener process, the probability distribution of the remaining useful life is defined as:

$$f(t) = \sqrt{\frac{(x_{th} - x_t)^2}{2\pi\sigma_B^2 t^3}} \exp\left(-\frac{(x_{th} - x_t - \lambda t)^2}{2\sigma_B^2 t}\right),$$

where $x_{th}$ is the failure threshold; and feeding life information back to the digital twin model to realize information update of the digital twin model; and the subsea Christmas tree re-prediction method integrating Kalman filter and Bayesian network being applied to a subsea Christmas tree re-prediction system integrating Kalman filter and Bayesian network, wherein the subsea Christmas tree re-prediction system comprises a subsea distribution unit information acquisition subsystem mounted, a subsea control module information acquisition subsystem, a subsea valve bank information acquisition subsystem, a wellhead mechanical module information acquisition subsystem, a subsea environmental information acquisition module, and a subsea Christmas tree digital twin subsystem, the subsea distribution unit information acquisition subsystem comprises a subsea distribution unit hydraulic information acquisition module, a subsea distribution unit degradation rate calculation module, and a subsea distribution unit electronic information acquisition module;

the subsea control module information acquisition subsystem comprises a subsea control module hydraulic information acquisition module, a subsea control module degradation rate calculation module, and a subsea control module electronic information acquisition module;

the subsea valve bank information acquisition subsystem comprises a subsea valve bank hydraulic information acquisition module and a subsea valve bank degradation rate calculation module;

the wellhead mechanical module information acquisition subsystem comprises a wellhead mechanical module information acquisition module and a wellhead mechanical module degradation rate calculation module; and the subsea Christmas tree digital twin subsystem comprises a system degradation rate calculation module, an initial degradation prediction module, a degradation process re-prediction module, a remaining useful life calculation module, and an information update module.

2. The subsea Christmas tree re-prediction method integrating Kalman filter and Bayesian network according to claim 1, wherein the subsea distribution unit hydraulic information acquisition module of the subsea distribution unit information acquisition subsystem is connected to a hydraulic distribution module through a cable for acquiring degradation data of the hydraulic distribution module;

the subsea distribution unit electronic information acquisition module is connected to an electronic distribution module through a cable for acquiring degradation data of the electronic distribution module;

the subsea distribution unit degradation rate calculation module is connected to the subsea distribution unit hydraulic information acquisition module and the subsea distribution unit electronic information acquisition module through cables for processing the degradation data acquired by the subsea distribution unit hydraulic information acquisition module and the subsea distribution unit electronic information acquisition module and calculating a degradation rate of the subsea distribution unit.

3. The subsea Christmas tree re-prediction method integrating Kalman filter and Bayesian network according to claim 1, wherein the subsea control module hydraulic information acquisition module of the subsea control module information acquisition subsystem is connected to a first solenoid valve, a second solenoid valve, a third solenoid valve, a fourth solenoid valve, a fifth solenoid valve, and a sixth solenoid valve through cables for acquiring degradation data of the first solenoid valve, the second solenoid valve, the third solenoid valve, the fourth solenoid valve, the fifth solenoid valve, and the sixth solenoid valve;

the subsea control module electronic information acquisition module is connected to the subsea electronic module through a cable for acquiring degradation data of the subsea electronic module; and the subsea control module degradation rate calculation module is connected to the subsea control module hydraulic information acquisition module and the subsea control module electronic information acquisition module through cables for processing the degradation data acquired by the subsea control module hydraulic information acquisition module and the subsea control module electronic information acquisition module and calculating a degradation rate of the subsea control module.

4. The subsea Christmas tree re-prediction method integrating Kalman filter and Bayesian network according to claim 1, wherein the subsea valve bank hydraulic information acquisition module of the subsea valve bank information acquisition subsystem is connected to a chemical injection valve, a conversion valve, an annulus wing valve, a production wing valve, a production main valve, and an annulus main valve through cables for acquiring degradation data of the chemical injection valve, the conversion valve, the annulus wing valve, the production wing valve, the production main valve, and the annulus main valve;

wherein the subsea valve bank degradation rate calculation module is connected to the subsea valve bank hydraulic information acquisition module through a cable for processing degradation data acquired by the subsea valve bank hydraulic information acquisition module and calculating a degradation rate of the subsea valve bank.

5. The subsea Christmas tree re-prediction method integrating Kalman filter and Bayesian network according to claim 1, wherein the wellhead mechanical module mechanical information acquisition module of the wellhead mechanical module information acquisition subsystem is connected to the wellhead mechanical module through a cable for acquiring degradation data of the wellhead mechanical module;

wherein the wellhead mechanical module degradation rate calculation module is connected to the wellhead mechanical module mechanical information acquisition module through a cable for processing the degradation data acquired by the wellhead mechanical module mechanical information acquisition module to calculate a degradation rate of the wellhead mechanical module.

6. The subsea Christmas tree re-prediction method integrating Kalman filter and Bayesian network according to claim 1, wherein the subsea environmental information acquisition module is connected to the subsea electronic module through a cable for acquiring subsea environmental information of the subsea Christmas tree and inputting the subsea environmental information into the subsea electronic module.

7. The subsea Christmas tree re-prediction method integrating Kalman filter and Bayesian network according to claim 1, wherein the system degradation rate calculation module of the subsea Christmas tree digital twin subsystem is connected to the subsea distribution unit degradation rate calculation module of the subsea distribution unit information acquisition subsystem, the subsea control module degradation rate calculation module of the subsea control module information acquisition subsystem, the subsea valve bank degradation rate calculation module of the subsea valve bank information acquisition subsystem, and the wellhead mechanical module degradation rate calculation module of the wellhead mechanical module information acquisition subsystem through cables for processing degradation rate information of the subsea distribution unit degradation rate calculation module, the subsea control module degradation rate calculation module, the subsea valve bank degradation rate calculation module, and the wellhead mechanical module degradation rate calculation module and calculating an overall degradation rate of the subsea Christmas tree;

the initial degradation prediction module is connected to the system degradation rate calculation module through a cable for initially predicting a system degradation state;

the degradation process re-prediction module is connected to the initial degradation prediction module through a cable for optimizing the system degradation state predicted by the initial degradation prediction module to realize the re-prediction of the degradation process;

the remaining useful life calculation module is connected to the degradation process re-prediction module through a cable for calculating an overall remaining useful life of the subsea Christmas tree system;

the information update module is connected to the remaining useful life calculation module through a cable for updating life information of the system;

the information update module is connected to the subsea electronic module through a cable for acquiring the environmental information and working state information of the subsea Christmas tree to achieve information update of the environment and working state; and the information update module is connected to the system degeneration rate calculation module by a cable for inputting the updated life information, environmental information, and working state information into the system degradation rate calculation module to realize parameter update of the system degradation rate calculation module.

* * * * *